Feb. 18, 1958     J. S. GREEN ET AL     2,824,287

SIGNAL-AMPLITUDE TO PULSE-DURATION CONVERTER

Filed May 13, 1955

JACK S. GREEN
ARTHUR H. NICHOLS
ROLAND G. SEMRAD
INVENTORS

BY Henry Heyman
ATTORNEY

United States Patent Office 2,824,287
Patented Feb. 18, 1958

2,824,287

SIGNAL-AMPLITUDE TO PULSE-DURATION CONVERTER

Jack Stuart Green, Los Angeles, Roland George Semrad, Inglewood, and Arthur H. Nichols, Los Angeles, Calif., assignors to Hughes Aircraft Company, Culver City, Calif., a corporation of Delaware Application May 13, 1955, Serial No. 508,114

14 Claims. (Cl. 332—1)

This invention relates generally to pulse coders and, more particularly, to signal-amplitude to pulse-duration converts employing at least one semiconductor translating device and suitable for telemetry transmission.

Telemetering for various purposes has been utilized for some time but long distance telemetering became important only during the last decade. Long distance telemetering generally refers to systems employing radiowave or microwave communication links as distinguished from wire communication links. Such systems are presently utilized primarily for testing high speed aircraft and the like.

The various long distance telemetering systems which were first developed and used were of the sub-carrier modulation type. The transmitted radio-frequency carrier waves were either amplitude-modulated or frequency-modulated. These modulation circuits employed vacuum tubes as their active circuit elements.

As long as the modulators above referred to were subjected only to slight stresses their operation was satisfactory, but in applications where severe stresses may be applied, the frequencies of the carrier wave generated by the vacuum tube circuits drifted. This drift in frequency caused the transmission of false signals, particularly where frequency-modulation of the sub-carrier was used, which in turn was used to modulate the frequency of the carrier wave.

In order to overcome the frequency drift problem, pulse coding of various types was adapted for long distasce telemetering. There are several types of pulse code modulation, for example where a pulse of radio-frequency energy is transmitted at a certain time, with respect to a fixed reference, which is determined by the amplitude of a control signal carrying the intelligence to be conveyed. The amplitude of the control signal may be used to effect transmission of waves of certain amplitudes or certain widths commensurate with the intelligence in the control signal. These modulation circuits generally employ vacuum tubes as their active circuit elements, as for example in phantastrons, multivibrators, and the like. To obtain proper operation and reasonable accuracy such pulse modulation circuits generally require large capacity and well-regulated power supplies. Small changes in supply voltage cause false information to be transmitted. These power supply requirements added weight and size to the telemetering package which, in turn, caused severe limitations in the use of telemetering systems in small spaces.

Accordingly, it is an object of this invention to provide a pulse coding circuit which requires a relatively low voltage supply, dissipates small amounts of power, and is relatively insensitive to supply voltage changes.

Another object of the present invention is to provide a pulse coding circuit particularly adapted for use in telemetering systems which utilizes transistors and is more rugged and reliable under severe stress conditions than previous pulse coders.

A signal-amplitude to pulse-duration converter circuit in accordance with the present invention uses as an amplifier a translating device including a semiconductor body having an input electrode, a common electrode, and an output electrode in contact therewith. An appropriate signal source is used to apply input signals to the circuit. Connected between the signal source and the common electrode of the amplifier is a differentiating sweep generator. When an input signal is applied to the generator, charge current flows through a charge storage device. The voltage to which the charge storage device may charge is determined by the amplitude of the applied input signal. A voltage representative of the derivation of the charge current with respect to time is developed across an impedance element which is connected to the charge storage device. This differentiated signal is applied to the amplifier and is reproduced across an output impedance connected to the output electrode of the amplifier. The output signal then is representative of the amplitude of the applied input signal.

The novel features of the present invention are set forth in particularity in the appended claims. Other and more specific objects of the invention will become apparent from a consideration of the following description taken in connection with the accompanying drawing, illustrating embodiments of the invention in which:

Figure 1:
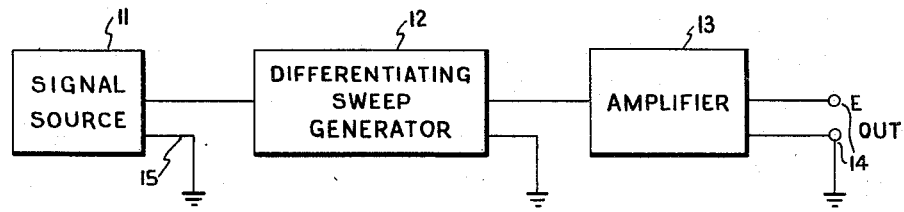
Fig. 1 is a block diagram of the pulse coding circuit of the present invention.

Referring now to the drawing and, more particularly, to Fig. 1, there is illustrated a pulse converter circuit including a signal source represented by a rectangle 11, which has a grounded lead 15. The signal source 11 may be a mechanical commutator or an electronic switching means of the type normally utilized with telemetering transmitters and which are well known to the art. The commutating device samples the readings of transducers, such as strain gauges or meters whose output signals are in the form of a direct-current voltage level which may vary, as for example between 0 and 5 volts, according to the particular conditions to be telemetered.

Signals from the commutator are applied to a differentiating sweep generator represented by rectangle 12. A sweep signal is generated by the generator and compared to the amplitude of the input signal. When the amplitude of the sweep signal equals the amplitude of the input signal, the sweep ceases and remains at the amplitude of the input signal for the duration thereof. The derivative with respect to time of the sweep signal is taken by a network within generator 12. Thus, a pulse whose duration is representative of the amplitude of the applied input signal is obtained. The differentiated signal is applied to an amplifier which is represented by a rectangle 13. The amplifier reproduces and amplifies the signal which appears at output terminals 14, one of which is grounded.

Figure 2:
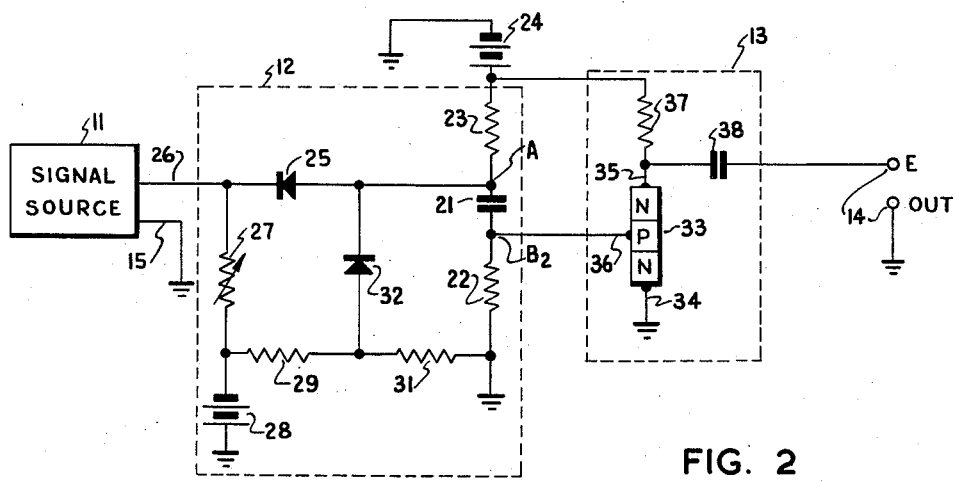
Fig. 2 is a schematic circuit diagram, partly in block form, of one embodiment of the signal-amplitude to pulse-duration converter of the present invention.

Referring now more particularly to Fig. 2 wherein the signal source 11 may be identical to that shown in Fig. 1 and described above. The differentiating sweep generator 12 is composed of a charge storage device such as capacitor 21 which has an impedance element such as resistor 22 connected between it and ground. Another impedance element such as resistor 23 is connected to capacitor 21 at point A. Connected between resistor 23 and ground is a source of potential such as battery 24 which has its negative terminal grounded. Rectifying means, such as diode 25, is connected between signal source 11 and capacitor 21 at point A. An input impedance device, such as adjustable resistor 27, is connected between signal source 11 and a source of potential, such as battery 28, which has its positive terminal grounded. A voltage divider composed of serially connected resistors 29 and 31 is connected between the negative terminal of battery 28 and ground. Clamping means, such as diode 32, is connected between the junction of resistors 29 and 31 and point A of capacitor 21.

The clamping means 32 and voltage divider 29, 31 are used to limit the charge which appears across capacitor 21 during quiescent conditions, but is not necessary for operation and may be omitted. Amplifier 13 utilizes a semiconductor translating device as its active circuit element and may, for example, be a junction transistor of the N-P-N type, as represented by rectangle 33 having the letters N-P-N therein. However, a junction transistor of the P-N-P type may be utilized. Transistor 33 includes an input or emitter electrode 34, an output or collector electrode 35, and a common or base electrode 36. Base 36 is connected to the junction between capacitor 21 and resistor 22, while emitter 34 is grounded. An output impedance element, such as resistor 37, is connected between collector 35 and the positive terminal of battery 24. Coupling means, such as capacitor 38, is connected between collector 35 and output terminals 14, one of which is grounded.

Figure 3:
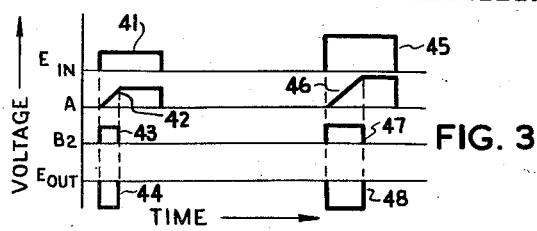
Fig. 3 is a graph illustrating voltage waveforms taken at various points throughout the circuit of Fig. 2.

In discussing the operation of the circuit of Fig. 2, reference will be made to Fig. 3, wherein the abscissa represents time and the ordinate, voltage. Curve $E_{in}$ is taken by measuring the voltage between terminal 26 of signal source 11 and ground; curve A, by measuring between point A and ground; curve $B_2$, by measuring between point $B_2$ and ground; and $E_{out}$, by measuring across output terminals 14.

During quiescent conditions, since base 36 and emitter 34 are both at the same potential level, transistor 33 is non-conducting. Diode 25 is conducting because its cathode is negative with respect to its anode due to battery 28. This establishes a potential at point A which is limited in a negative direction by diode 32 to the potential at the junction between resistors 29 and 31. Capacitor 21 has a charge appearing across it which is equal to the potential between point A and ground. Since transistor 33 is non-conducting, no current flows through resistor 22 during quiescent conditions and point $B_2$ of capacitor 21 remains at ground potential.

As a first example of operation, assume that an input signal, such as pulse 41 of curve $E_{in}$ is applied by signal source 11 to sweep generator 12. This input pulse is developed across resistor 27, causing diode 25 to become non-conducting. Capacitor 21 will then begin to charge toward the potential of battery 24, as represented by the sloping portion 42 of curve A in Fig. 3. As this voltage rises, its derivative with respect to time appears across resistor 22, as indicated by pulse 43 of curve $B_2$. Since only the first portion of the exponential charge curve of capacitor 21 is used and the potential of battery 24 is large compared to the amplitude of the input pulse 41, the sloping portion 42 of curve A is substantially linear with time. The derivative of a linear function is a constant; therefore, the voltage appearing across resistor 22 rises to a predetermined value and remains at this value during the rise time of curve A. When the charge across capacitor 21 equals the amplitude of input pulse 41 so that the anode of diode 25 becomes slightly positive with respect to its cathode, diode 25 again conducts, thereby limiting the voltage appearing at point A to the amplitude of the input pulse. Since the charge appearing across capacitor 21 can no longer change, its derivative will become zero. Therefore, the voltage appearing across resistor 22 drops to zero at the time when diode 25 begins to conduct. Pulse 43 is applied as an input signal to base 36 of transistor 33. Pulse 43 raises the potential level of base 36 above emitter 34 and thus causes transistor 33 to begin conducting, immediately saturating; that is, collector current rises to a maximum. The voltage appearing at collector 35 decreases from the potential of battery 24 in accordance with the current flow through resistor 37. This causes an amplified reproduction of pulse 43 to appear at collector 35, but in reverse polarity, as shown by pulse 44 of curve $E_{out}$ in Fig. 3. Pulse 44 is applied by capacitor 38 to output terminals 14 where it may be used as a modulation signal.

Assume now that at some later time the input signal $E_{in}$ has increased in amplitude, as represented by pulse 45 of curve $E_{in}$. Once again, diode 25 will stop conducting and capacitor 21 will begin to charge toward the potential of battery 24. However, in this instance, the charge appearing across capacitor 21 will reach a higher voltage level, as represented at point 46 of curve A. This, in turn, causes the differentiated sweep portion of curve A to increase in duration, as shown at 47 of curve $B_2$. This, in turn, causes the signal appearing at collector 35 to increase in duration, as shown at 48 of curve $E_{out}$. If the applied input signal decreased in amplitude, the duration of the output pulse would decrease accordingly.

Thus, it is seen that the signal appearing at output terminals 14 is directly proportional in time duration to the amplitude of the input signal from signal source 11.

Resistor 27 is adjusted so that capacitor 21 can discharge fully between the application of input pulses from signal source 11 to the voltage level established by clamping means 29, 31, and 32. Therefore, the generated sweep starts from the same potential level in response to the application of each input pulse.

The sweep generator, as shown in Fig. 2, may be used only when the impedance looking into signal source 11 is relatively low. If the impedance of the signal source is high with respect to the input impedance of sweep generator 12, additional impedance must be added to the sweep generator to insure accurate operation.

Figure 4:
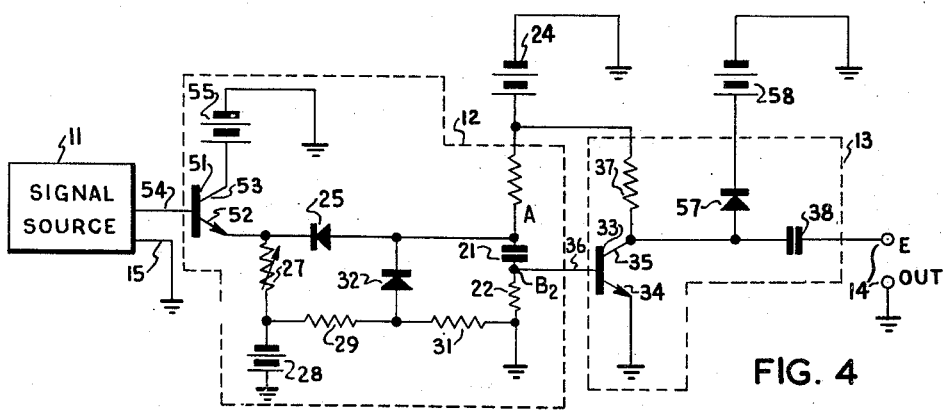
Fig. 4 is a schematic circuit diagram, partly in block form, of the preferred embodiment of the signal-amplitude to pulse-duration converter in accordance with the invention.

Referring now more particularly to Fig. 4, the pulse coder shown there is identical to the circuit of Fig. 2 with the following exceptions. Additional impedance is included in the input impedance device by the use of transistor 51, which may for example be an N-P-N junction transistor including an emitter electrode 52, a collector electrode 53, and a base electrode 54 in contact with the semiconductor body of transistor 51. A source of potential, such as battery 55, having its negative terminal grounded, is connected to collector 53. Base 54 is connected to signal source 11 while emitter 52 is connected to adjustable resistor 27.

Clamping means, such as serially connected diode 57 and battery 58, having its negative terminal grounded, is connected to collector 35 of transistor 33.

The operation of the circuit of Fig. 4 is identical to that of Fig. 2. However, by the use of transistor 51, a signal source having relatively high impedance or a varying impedance may be used to supply the signal to sweep generator 12, transistor 51 functioning only as an input impedance device.

The output signal appearing at terminals 14 is limited in its negative swing by diode 57 to the potential of battery 58. This serves to supply constant amplitude output signals from the circuit of this invention.

It will be understood that circuit specifications for the signal-amplitude to pulse-duration converter circuit shown in Fig. 4 may vary according to the design for any particular application. The following circuit specifications are included by way of example only, suitable for operation with an input signal having a repetition rate of from zero to 1,000 cycles per second.

Transistor 33—N–P–N junction transistor Western Electric Type WE 1859
Transistor 51—N–P–N junction transistor Western Electric Type WE 1858
Resistor 22—1,000 ohms
Resistor 23—100,000 ohms
Adjustable resistor 27—0–25,000 ohms
Resistor 29—4,700 ohms
Resistor 31—510 ohms
Resistor 37—24,000 ohms
Capacitor 21—.022 microfarad
Capacitor 38—.1 microfarad
Diode 25—1N67A
Diode 32—1N67A
Diode 57—1N67A
Battery 24—30 volts
Battery 28—15 volts
Battery 55—15 volts
Battery 58—15 volts If transistors 23 and 51 are of the P–N–P type, the polarities of biasing potentials and applied signals must be reversed to obtain operation.

There have been thus disclosed several embodiments of a signal-amplitude to pulse-duration converter circuit employing at least one semiconductor translating device for use in long distance telemetering systems. These circuits require small capacity power supplies for proper operation and are relatively insensitive to shock or severe stress which may be imposed upon them.

What is claimed is:

1. A signal-amplitude to pulse-duration converter circuit for developing an output pulse whose duration is directly proportional to the amplitude of an applied input signal comprising: an input signal source for developing the input signal; a differentiating sweep generator including charge storage means having first and second terminals, circuit means connected between said first terminal and a common terminal point for discharging said storage means, a source of biasing potential, an impedance element connected between said second terminal and said source of biasing potential, rectifying means connected between said second terminal and said input signal source; and a junction transistor amplifier for producing an output pulse that is proportional to the charging current to said storage means and having an input and an output circuit, said input circuit being connected between said first terminal and said common terminal point for conducting a portion of the charging current to said charging means through said input circuit.

2. A signal-amplitude to pulse-duration converter circuit for developing an output pulse whose duration is directly proportional to the amplitude of an applied input signal comprising: an input signal source for developing the input signal; a differentiating sweep generator including charge storage means having a first and second terminal, a first impedance element connected between said first terminal and a common terminal point, a first source of biasing potential, a second impedance element connected between said second terminal and said source of biasing potential, rectifying means connected between said second terminal and said signal source to cause said storage means to charge toward the potential of said biasing source for a period of time that is directly proportional to the amplitude of the input signal; a second source of biasing potential; an input impedance device connected between said signal source and said second source of biasing potential; a signal translating device including a semiconductor body having an input electrode, an output electrode, and a common electrode in contact therewith, said common electrode being connected to said first terminal, said input electrode being connected to said common terminal point; and a load impedance element connected between said output electrode and said source of biasing potential for developing the output pulse.

3. A signal-amplitude to pulse-duration converter circuit for developing an output pulse whose duration is directly proportional to the amplitude of an applied input signal comprising: an input signal source for developing the input signal; a differentiating sweep generator including charge storage means having a first and second terminal, a first impedance element connected between said first terminal and a common terminal point, a first source of biasing potential, a second impedance element connected between said second terminal and said first source of biasing potential, rectifying means connected between said second terminal and said signal source, clamping means connected between said second terminal and said common point to cause said charge storage means to start charging from the same voltage level in response to the application of each input signal, a second source of biasing potential, an input impedance device connected between said signal source and said second source of biasing potential; a signal translating device including a semiconductor body having an input electrode, an output electrode, and a common electrode in contact therewith, said common electrode being connected to said first terminal, said input electrode being connected to said common point, and a load impedance element connected between said output electrode and said first source of biasing potential.

4. In a circuit for producing an output pulse which varies in duration according to the amplitude of an applied input signal having an input signal source and an amplifier, a differentiating sweep generator comprising: charge-storage means having first and second terminals; a first source of biasing potential; a first impedance element connected between said second terminal and said source of biasing potential, a second impedance element connected between said first terminal and a common terminal point; rectifying means connected to said second terminal; a second source of biasing potential and an input impedance device connected between said rectifying means and said second source of biasing potential, whereby a voltage representing the derivative with respect to time of the current flowing through said charge storage device is developed across said second impedance element in response to the application of the input signal to said generator.

5. In a circuit for producing an output pulse which varies in duration according to the amplitude of an applied input signal having an input signal source and an amplifier, a differentiating sweep generator comprising: charge storage means having first and second terminals; a first source of biasing potential; a first impedance element connected between said second terminal and said first source of biasing potential, a second impedance element connected between said first terminal and a common terminal point; rectifying means connected to said second terminal; a second source of biasing potential; an input impedance device connected between said rectifying means and said second source of biasing potential; and clamping means connected between said second terminal and said common point for causing said charge storage device to start charging from the same voltage level in response to the application of each input signal, whereby a voltage representing the derivative with respect to time of the current flowing through said charge storage device is developed across said second impedance element in response to the application of the input signal to said generator.

6. The differentiating sweep generator defined in claim 5 wherein said first and second impedance elements are resistors, said charge storage means is a capacitor, and said rectifying means is a diode.

7. A signal-amplitude to pulse-duration converter circuit for developing an output pulse whose duration is directly proportional to the amplitude of an applied input signal comprising: an input signal source for developing the input signal; an amplifier for developing the output pulse; and a differentiating sweep generator connected between said input signal source and said amplifier including charge storage means having first and second terminals, a first source of biasing potential, a first impedance element connected between said second terminal and said first source of biasing potential, a second impedance element connected between said first terminal and a common terminal point, rectifying means connected to said second terminal, a second source of biasing potential, an input impedance device connected between said rectifying means and said second source of biasing potential, and clamping means connected between said second terminal and said common point for causing said charge storage device to start charging from the same voltage level in response to the application of each input signal, whereby a voltage representing the derivative with respect to time of the current flowing through said charge storage device is developed across said second impedance element in response to the application of each input signal to said generator.

8. The signal-amplitude to pulse-duration converter circuit defined in claim 7 wherein said amplifier is a grounded-emitter junction transistor amplifier.

9. A signal-amplitude to pulse-duration converter circuit for developing an output pulse whose duration is directly proportional to the amplitude of an applied input signal comprising: an input signal source for developing the input signal; a differentiating sweep generator including charge storage means having a first and second terminal, a first impedance element connected between said first terminal and a common terminal point, a first source of biasing potential, a second impedance element connected between said second terminal and said first source of biasing potential, rectifying means connected between said second terminal and said signal source, clamping means connected between said second terminal and said common point to cause said charge storage means to start charging from the same voltage level in response to the application of each input pulse, a second source of biasing potential, an input impedance device connected between said signal source and said second source of biasing potential; a junction transistor including an emitter, a collector, and a base, said base being connected to said first terminal, said emitter being connected to said common point, and a load impedance element connected between said collector and said first source of biasing potential for developing the output pulse representative of the amplitude of the input signal.

10. A signal-amplitude to pulse-duration converter circuit for developing an output pulse whose duration is directly proportional to the amplitude of the applied input signal comprising: an input signal source for developing the input signal; a differentiating sweep generator including charge storage means having a first and second terminal, a first impedance element connected between said first terminal and a common terminal point, a first source of biasing potential, a second impedance element connected between said second terminal and said first source of biasing potential, clamping means connected between said second terminal and said common point to cause said charge storage means to start charging from the same voltage level in response to the application of each input pulse, a second source of biasing potential, an input impedance device including a first transistor having a first emitter, a first collector, and a first base, said base being connected to said signal source, said collector being connected to said first source of biasing potential, a third impedance element connected between said emitter and said second source of biasing potential, a diode connected between said second terminal and said first emitter; a second transistor including a second emitter, a second collector, and a second base, said second base being connected to said first terminal, said second emitter being connected to said common point; and a load impedance element connected between said second collector and said first source of biasing potential for developing the output pulse representative of the amplitude of the input signal.

11. The signal-amplitude to pulse-duration converter circuit defined in claim 10 wherein said first and said second transistors are junction transistors of the N-P-N type.

12. The signal-amplitude to pulse-duration converter circuit defined in claim 10 wherein additional clamping means is connected between said second collector and said source of biasing potential for limiting the potential level of the output pulse to a predetermined value.

13. The signal-duration to pulse-amplitude converter circuit defined in claim 12 wherein said additional clamping means includes a diode.

14. A signal-amplitude to pulse-duration converter circuit for developing an output signal whose duration is proportional to the amplitude of an applied input signal comprising: a differentiating sweep generator including charge storage means, input signal means for applying an input signal to said generator to cause said generator to charge said storage means at a predetermined rate for a period of time that is proportional to the amplitude of the input signal, a transistor including an emitter, a collector and a base, said base and emitter being connected in series relationship with said charge storage means and said input signal means for conducting a portion of the charging current to said charge storage means through said base and emitter, and means coupled to said emitter and collector for deriving an output signal from said transitor.

References Cited in the file of this patent
UNITED STATES PATENTS

| | | |
|---|---|---|
| 2,435,496 | Guanella et al. | Feb. 3, 1948 |
| 2,513,308 | Grieg | July 4, 1950 |

FOREIGN PATENTS

| | | |
|---|---|---|
| 767,701 | Germany | Mar. 30, 1953 |